July 31, 1956 J. J. MORRISSEY 2,756,478
FISHLINE CONNECTOR JOINT
Filed July 26, 1952
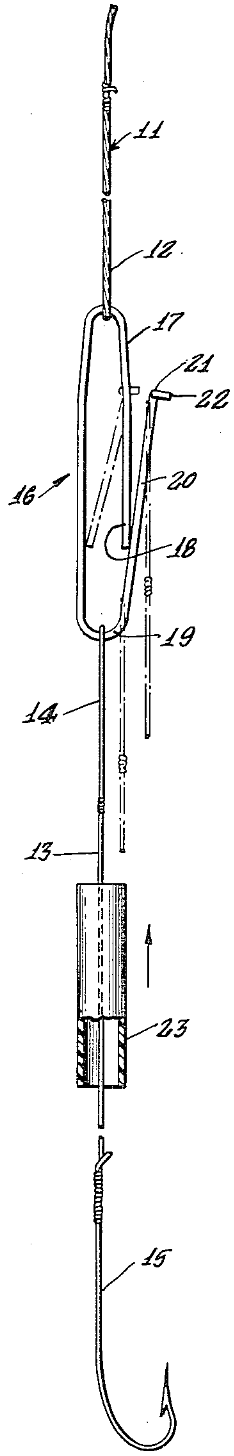
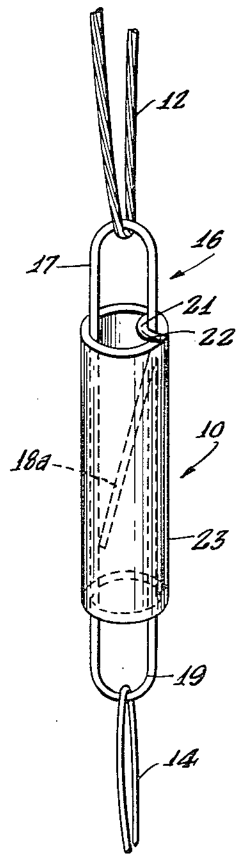
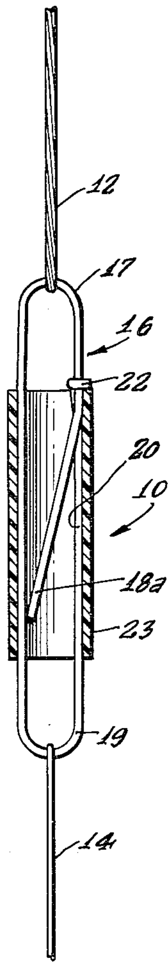
INVENTOR.
JOHN J. MORRISSEY
BY H. G. Manning
ATTORNEY.

United States Patent Office 2,756,478 Patented July 31, 1956

2,756,478

FISHLINE CONNECTOR JOINT

John J. Morrissey, Torrington, Conn.

Application July 26, 1952, Serial No. 301,140

1 Claim. (Cl. 24—237)

This invention relates to connectors, and more particularly to a connector joint for a fishline.

One object of this invention is to provide a fishline connector joint having means for readily attaching fish hooks to the line and removing them therefrom without the inconvenience of tying and untying knots, or cutting the line.

Another object is to provide a fishline connector joint of the above nature which will be small enough to pass through the guides of a fish pole so that it may be wound on the reel with the line.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawing,

Fig. 1 is a side view of a fish hook, snell and line, with the connector tube and spring clip shown in disconnected position.

Fig. 2 is a perspective view on a larger scale of the spring clip with the connector tube assembled thereon and connected to the fishline and snell.

Fig. 3 is a side view of the same showing the connector tube in cross section.

Referring now to the drawing, in which like reference numerals denote corresponding parts throughout the several views, the numeral 10 indicates generally the assembled fishline connector joint. The numeral 11 indicates a fishline having a lower loop 12 connected with a wire spring clip 16, to be hereinafter described. The numeral 13 indicates a stiff flexible snell member having an upper loop 14 connected at its upper end to the clip 16 and at its lower end to a fish hook 15.

The spring clip 16 includes at its upper end a U-shaped loop 17 having a free depending end 18 and at its lower end a U-shaped loop 19 having an upstanding free end 20. The end 20 is provided on its extremity with an outturned curved end 22 forming a transverse shoulder 21 and serving as a stop for a cylindrical transparent, plastic protective tube 23 which is adapted to be frictionally fitted over the sides of the clip 16, as clearly shown in Figs. 2 and 3.

*Operation*

In the operation of the present invention, the loop 12 of the fishline 11 will first be attached to the upper loop 17 of the wire clip 16, and the loop 14 of the snell 13 will be fastened to the lower loop 19 of said clip as clearly shown in Fig 1 it will be understood that the transfer shoulder 21 will first have been snapped into engagement with the loop 17, as shown in dotted lines in Fig. 1 and in full lines in Fig 2. The plastic protective tube 23, which will previously have been placed around the snell 13, will then be slid upwardly over the clip 16 until it engages the shoulder 21 thereon, causing the end of the depending free arm 18 of the upper U-shaped loop 17 to swing inwardly and assume the inclined position 18a. This is due to the fact that the internal diameter of the tube 23 is less than the external width of the upper section of the U-shaped wire clip 16. The tube 23 will thus frictionally engage the clip 16 so that it will be impossible for said tube to accidentally slip off of said clip during use, thus positively locking the snell in position on said clip. To open the clip it is only necessary to push the resilient arm 20 inwardly to disengage the shoulder 21 from the arm 18.

It will be understood that even if the tube 23 is removed, the end 20 of the clip 16, will remain in its inner locked position with the shoulder 21 engaging the arm 18 as seen in Figs. 2 and 3. For this reason, in some cases the tube may be dispensed with if desired.

In use, a set of interchangeable fish hooks and flies may be carried in a suitable kit box so that they may be easily attached to the fishline whenever desired.

This arrangement also facilitates the connection of the hook to the line and the removal thereof at the end of a day's fishing, and the hook and snell may then be packed in the kit box where they will not cause injury.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a fish line connector joint, a wire spring clip comprising a pair of oppositely extending upper and lower U-shaped sections connected together on one side and having depending and upstanding overlapping free ends respectively, the upstanding free end of the lower U-shaped section having an inwardly curled shoulder on its upper end terminating in an outwardly projecting end extending beyond the remainder of said upstanding free end of the lower U-shaped section to engage the depending free end of the upper U-shaped section and adapted to form a stop, and a thin elongated tube frictionally fitted over the lower part of said clip and having its upper end adapted to engage said stop, the internal diameter of said tube being less than the width of the upper U-shaped section of said clip to cause the depending free end of said upper section to incline inwardly and the tube to press against the sides of the upper U-shaped section, so as to lock a snell which is attached to the lower U-shaped section of the clip.

References Cited in the file of this patent

UNITED STATES PATENTS

| | | |
|---|---|---|
| 134,756 | Marston | Jan. 14, 1873 |
| 391,317 | Haish | Oct. 16, 1888 |
| 1,351,669 | Mansfield | Aug. 31, 1920 |
| 2,001,844 | Kumm | May 21, 1935 |
| 2,139,424 | Simon | Dec. 6, 1938 |
| 2,603,902 | Stanwyck | July 22, 1952 |
| 2,640,247 | Pari | June 2, 1953 |